L. C. STUART.
FOLDING SPY GLASS.
APPLICATION FILED JULY 5, 1911.
1,054,253.
Patented Feb. 25, 1913.
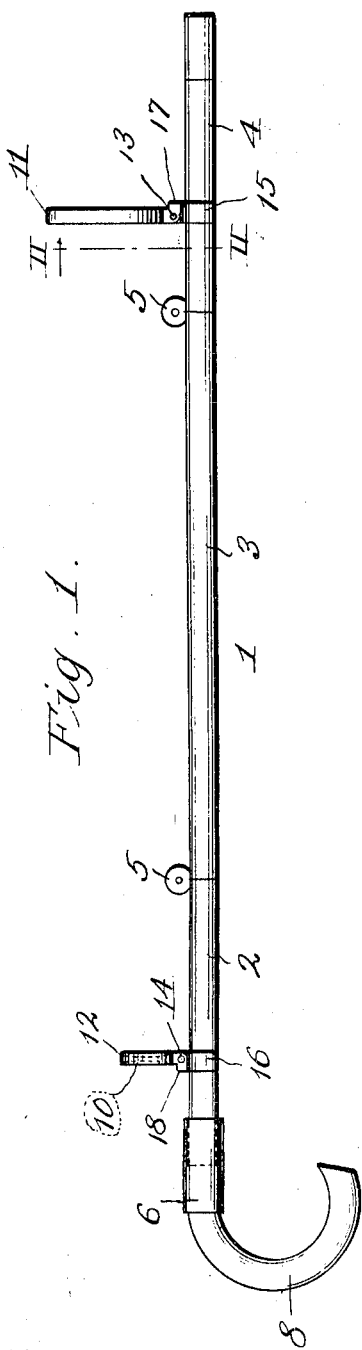
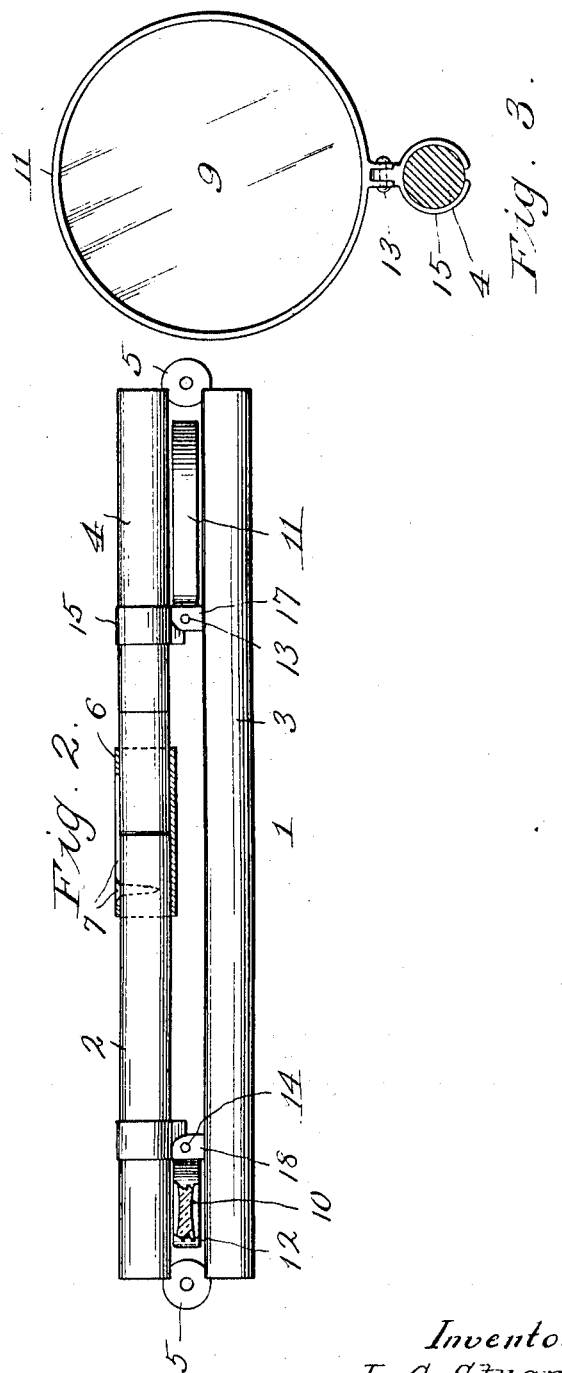
Witnesses:
E. C. Lillian
F. W. Lanoix
Inventor,
L. C. Stuart,
By F. G. Fischer,
atty.

UNITED STATES PATENT OFFICE.

LOUIS C. STUART, OF KANSAS CITY, MISSOURI, ASSIGNOR OF ONE-HALF TO SUSAN LINDSEY, OF PARSONS, KANSAS.

FOLDING SPY-GLASS.

1,054,253.  Specification of Letters Patent.  Patented Feb. 25, 1913.

Application filed July 5, 1911. Serial No. 636,989.

*To all whom it may concern:*

Be it known that I, LOUIS C. STUART, a citizen of the United States, residing at Kansas City, in the county of Jackson and State of Missouri, have invented certain new and useful Improvements in Folding Spy-Glasses, of which the following is a specification.

My invention relates to improvements in folding spy-glasses, and my object is to provide a simple, inexpensive device of this character which may be used as a cane, or folded into compact form when not in use, so that it can be conveniently carried by tourists and others desiring a powerful glass at small cost.

In order that the invention may be fully understood, reference will now be made to the accompanying drawing, in which—

Figure 1 shows a side elevation of the device extended for use. Fig. 2 is a side elevation, partly in section, of the device folded, so that it will occupy but little space, and Fig. 3 is a cross section on line III—III of Fig. 1.

In carrying out the invention I employ a stick, preferably in the form of a cane 1, consisting of a plurality of sections 2, 3, and 4, which may be increased or diminished in number, as desired.

Sections 2, 3, and 4 are connected by a pair of friction hinges 5, which will hold the sections either in the extended position shown in Fig. 1, or folded as shown in Fig. 2. When the sections are folded, however, they are further secured by a sleeve 6 having a screw-and-slot connection 7 with section 2, so that said sleeve can be slid over the adjacent end of section 4. When the cane is extended, its removable handle 8 is secured to the free end of sleeve 6, as shown in Fig. 1.

9 designates the object-glass and 10 the ocular-glass of the device. Said glasses are mounted in frames 11 and 12, pivotally-secured at 13 and 14 to spring-clamps 15 and 16, adapted to snugly embrace sections 4 and 2, respectively, but which may be slid backward or forward on said sections to obtain the desired focus. The pivots 13 and 14 permit the glasses and their frames 11 and 12 to be folded to the positions shown in Fig. 2, when the cane is folded, and said pivots hold the bifurcated portions of the frames in frictional contact with the interposed portions of the clamps, so that said frames will reliably remain in the raised position, shown in Fig. 1, or the folded position shown in Fig. 2. Frames 11 and 12 have lugs 17 and 18, respectively, extending at right angles thereto and adapted to act as stops by abutting against their respective clamps 15 and 16, when said frames are raised to vertical position.

When it is desired to use the cane as a walking-stick, the glasses and their frames may be folded out of the way, or they may be entirely removed.

While I have shown and described the device as being applied to a stick, it is obvious that with slight modifications it can be readily adapted for use as a sight on rifles.

Having thus described my invention, what I claim, and desire to secure by Letters Patent, is:

1. In a device of the type described, a cane composed of three hingedly connected sections, a foldable glass carried by each end section and adapted to engage between the middle section and the end sections when the glasses are in folded position in engagement with the end sections and the end sections are moved to overlie the middle section, whereby the glasses are protected by said sections which overlie same on both faces thereof and means to hold the end sections against movement.

2. In a device of the type described, a cane composed of three hingedly connected sections, a foldable glass carried by each end section and adapted to engage between the middle section and the end sections when the glasses are in folded position in engagement with the end sections and the end sections are moved to overlie the middle section, whereby the glasses are protected by said sections which overlie same on both faces thereof and a sleeve slidably carried by the free or outer end of one end section and having its outer end movable to engage over the free or outer end of the other end section to hold the end sections locked when the sections are in folded position.

3. In a device of the type described, a cane composed of three hingedly connected sections, a foldable glass carried by each end section and adapted to engage between the middle section and the end section when the glasses are in folded position in engagement with the end sections and the end sections are moved to overlie the middle section, whereby the glasses are protected by said sections which overlie same on both faces thereof and a sleeve slidably carried by the free or outer end of one end section and having its outer end movable to engage over the free or outer end of the other end section to hold the end sections locked when the sections are in folded position, and a handle engaged in the outer end of the sleeve and being disengageable therefrom to permit the sections to be folded.

In testimony whereof I affix my signature, in the presence of two witnesses.

LOUIS C. STUART.

Witnesses:
F. G. FISCHER,
E. C. LILLIAN.